May 7, 1957  C. S. MERTLER  2,791,662
THERMOSTAT DETENT
Filed Aug. 2, 1954

INVENTOR.
CHARLES S. MERTLER
BY
Woodling and Krost,
atty.

United States Patent Office 2,791,662

Patented May 7, 1957

2,791,662

THERMOSTAT DETENT

Charles S. Mertler, Mansfield, Ohio, assignor to Stevens Manufacturing Company, Inc., a corporation of Ohio Application August 2, 1954, Serial No. 447,096

16 Claims. (Cl. 200—139)

The invention relates in general to thermostatic devices and more particularly to such devices having a detent or tactile indication as to a change of condition in the thermostat.

Thermostats have been constructed wherein a deflecting member has been provided to give positive assurance that the thermostat electrical contacts are out of engagement at one end of the operating temperature range. This has been termed a positive "off" and is generally incorporated in connection with a stop so that as the adjustment member of the thermostat is moved to abut the stop the contacts are forcibly held open even though the temperature of the ambient may vary considerably. Such thermostats have been used in electric flatirons, for example, wherein the normal operating temperature range is considerably above room temperature. The "off" position of the thermostat may thus be positioned quite closely adjacent the lower extremity of the operating temperature range with the deflecting member providing a positive "off" or open condition of the contacts and without an excess of space wasting adjustment movement of the adjustment member.

Many electrical devices incorporate an "off" and "on" switch in connection with an adjustment device, such as the generally familiar "off-on" switch mounted in conjunction with the variable volume control of the ordinary radio receiving set. This has become quite familiar to millions of people; and since the "on-off" switch incorporated in the volume control has some form of toggle mechanism which must be overcome, there is a tactile indication given to the operator that the radio receiving set is switched "off" or "on" as the case may be.

Accordingly, it is an object of this invention to provide some form of tactile or sensory indication of an "off" condition in combination with an operating temperature adjustment of a thermostat.

Another object of the invention is to provide a detent in a thermostat to give this tactile indication.

Another object of the invention is to provide a detent providing a mechanical resistance which must be overcome by the operator of a thermostat and with this mechanical resistance being so positioned as to be substantially at the boundary or the junction between the "off" and "on" conditions of the contacts in the thermostat.

Still another object of the invention is to provide a thermostat including a positive "off" device and a detent giving an indication as to when the thermostat is in the positive "off" condition.

Still another object of the invention is to provide a detent for a thermostat which has an "off" position wherein the detent prevents accidental closing of the thermostat contacts by jarring, vibration, or otherwise.

Still another object of the invention is to provide a thermostat having an "off" position and wherein means is provided to establish coordination between the "off" position and the "feel" or tactile indication of the thermostat being in the "off" condition.

Still another object of the invention is to provide a detent on a thermostat having a stop to provide two rotational limits of the adjustment member with the detent being placed adjacent one of the rotational limits.

Still another object of the invention is to provide a detent on a thermostat which is adjacent one rotational limit of the adjustment member of the thermostat and with this detent separating the "off" and "on" conditions of the operating temperature of the thermostat.

Other objects and a fuller understanding of this invention may be had by referring to the following description and claims, taken in conjunction with the accompanying drawings, in which:

Figure 1:
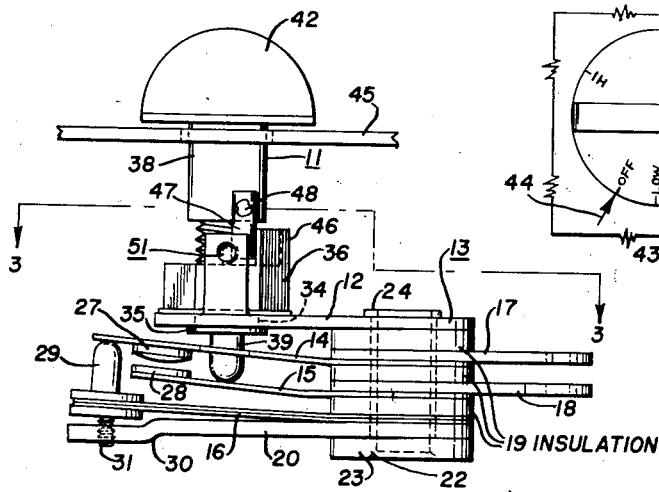
Figure 1 is a side elevational view of a thermostat incorporating the invention.

The Figures 1, 2, 3, and 6 show the details of construction of a thermostat 11 constructed according to this invention. The thermostat 11 has a base 12 which fixedly carries a stack 13. First and second contact strips 14 and 15 have the first ends thereof carried in the stack 13. A flexible bimetallic strip 16 has the first end thereof carried in the stack 13. Terminals 17 and 18 are mounted in the stack 13 in contact with the strips 14 and 15, respectively. Insulating washers 19 mutually insulate the contact strips 14 and 15 from the stack 13. A rigid deflecting strip 20 has the first end thereof in the stack 13. A hollow rivet 22 having a head 23 is carried on the base 12 as by staking at 24. The rivet 22 thus securely fastens together the first ends of all the strips 14, 15, 16, and 20.

The first and second contact strips 14 and 15 carry first and second contacts 27 and 28, respectively. The first contact strip 14 has a natural resiliency urging it downwardly, as viewed in Figure 1, and the second contact strip 15 has a natural resiliency urging it upwardly; hence, the contacts 27 and 28 are urged toward mutual engagement. An insulator tip 29 is carried by the outer end of the bimetallic strip 16 and engages the outer end of the first contact strip 14. The deflecting strip 20 has an offset at 30 and carries an adjusting screw 31. The bimetallic strip 16 in its unbiased state extends generally perpendicular to the stack 13; however, the adjusting screw 31 biases the strip 16 upwardly in a direction the same as the bimetallic strip is stressed during temperature changes toward the operating temperature range which in this case is an increasing temperature.

The base 12 has an aperture 34 to receive an extension 35 of a nut 36 with this extension 35 being staked to the base 12. The nut has a threaded aperture 37 to receive an adjusting screw 38. The adjusting screw 38 carries a porcelain tip 39 which passes through an aperture in the strip 14 and bears against the contact strip 15 to adjustingly position this strip 15. A knob 42 is attached to the upper end of the adjusting screw or shaft 38 and this knob 42 may carry indicia 43 for cooperation with a pointer 44 on a cover plate 45 of the electrical appliance with which the thermostat 11 is used.

The thermostat is provided with stop means which includes an axially parallel projection 46 on the nut 36 and a round bar 47 welded at 48 to the shaft 38. The projection 46 may be of any desired arcuate width to thus provide the desired arcuate rotation of the screw 38 relative to the base 12. A detent 51 is provided which includes a part of the stop means, namely, the round bar 47 in connection with a detent spring member 52. The spring member 52 is L-shaped with first and second legs 53 and 54, respectively. The detent spring member is better shown in Figure 6. The first leg 53 has an oval shaped hole 55 so that this hole will surround the adjusting screw 38 when this first leg 53 is fastened in place between the nut 36 and the base 12. The oval shaped hole 55 provides adjustment during initial assembly before the nut is staked to the base and also permits use of the detent spring member 52 with shafts of two different diameters so that the spring member 52 may be used with different forms of production thermostats.

The second leg 54 extends upwardly alongside the nut 36 and has an inwardly extending detent dimple 56. This dimple frictionally cooperates with the outer edge of the round bar 47. The second leg 54 is rotationally positioned relative to the nut 36 so that the detent dimple 56 is closely adjacent one end of the projection 46, and the round bar 47 has just sufficient space to be accommodated between the detent dimple 56 and the clockwise edge 57 of the projection 46 as viewed in Figure 3.

*Operation*

Figure 2:
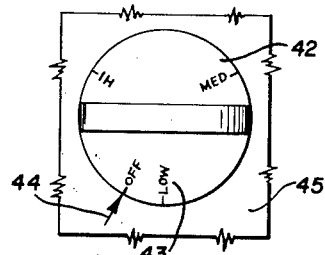
Figure 2 is a plan view of the scale and pointer of the thermostat.
Figure 4:
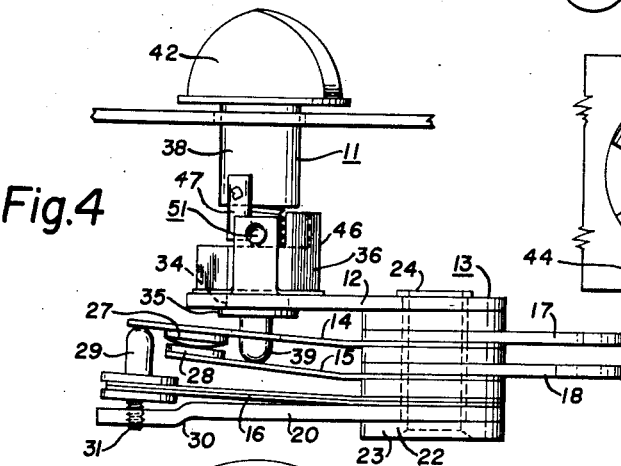
Figures 4 and 5 are views similar to Figures 1 and 2 with the thermostat in a different adjustment position.
Figure 5:
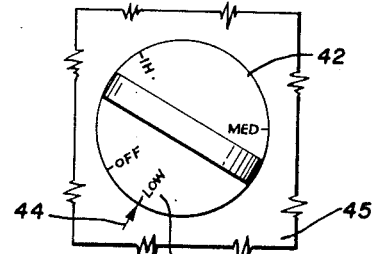
Figure 6:
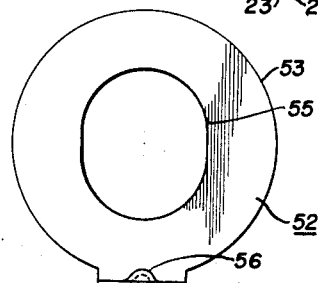
Figure 6 is a plan view of a detent spring.

The adjusting screw 38 has been provided with a left-hand thread so that when the knob 42 is turned clockwise, as viewed in Figures 2 and 5, the operating temperature will be increased because the adjusting screw 38 has moved longitudinally upwardly, as viewed in Figures 1 and 4. By moving this screw upwardly, the porcelain tip 39 moves upwardly to permit the contact 28 to move upwardly. This means that the bimetallic strip 16 must move upwardly to a greater extent in order to open the contacts 27 and 28.

Figure 3:
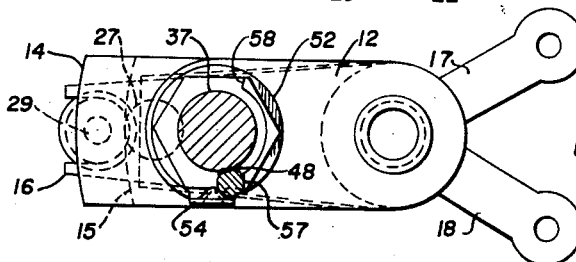
Figure 3 is a section on the line 3—3 of Figure 1.

The Figures 1, 2, and 3 show the thermostat 11 as being in one of its rotational limit positions. This is actually a longitudinal limit position of the screw 38 and hence may also be considered an adjustment limit position. With the bimetallic strip 16 so positioned to move upwardly for increasing temperatures, the position of Figures 1, 2, and 3 may be considered to be the lowest temperature setting. Actually, it is an "off" position as shown in Figures 1 and 2 since the contacts 27 and 28 are not in contact and cannot mutually engage despite decreasing temperatures. When the round bar 47 is positioned against the counterclockwise edge 58 of the projection 46, the thermostat is adjusted to its highest operating temperature.

The detent 51, which includes as part thereof the round bar 47, gives a "feel" or tactile indication to the thermostat operator that the thermostat is in the "off" position, namely, that shown in Figures 1 to 3. The Figures 4 and 5 show the thermostat adjusted with the round bar 47 immediately adjacent the detent dimple 56. As shown in Figure 5, this is the low temperature setting. The knob 42 may be turned clockwise from this position through the medium and to the high temperature settings whereat the round bar 47 will be in engagement with the edge 58 of the projection 46. This may be termed the normal operating range of the thermostat 11. With the thermostat in the position shown in Figures 4 and 5 if the knob 42 is turned counterclockwise, as shown in Figure 5, the round bar must cammingly slide past the detent dimple 56. The second leg 54 is positioned sufficiently close to the round bar 47 so that as the round bar slides past the detent dimple 56, the second leg 54 must spring outwardly to permit this movement. This gives a mechanical resistance which must be overcome by the operator and which accordingly gives him the sense of feel to indicate that the thermostat has been moved to the "off" condition.

This detent 51 has particular adaptability in connection with the positive "off" type of thermostat illustrated. The deflecting strip 20 which carries the small adjusting screw 31 is initially adjusted during assembly so that the contacts 27 and 28 are in engagement, as shown in Figure 4, when the knob is in the low temperature position, as shown in Figure 5; and further this adjusting screw 31 is adjusted so that the contacts 27 and 28 are out of engagement when the knob 42 is in the "off" position, as shown in Figure 2. As shown in Figures 1 and 4, the bimetallic strip 16 is stressed upwardly by the adjusting screw 31 through a small arc, and this upward deflection of the bimetallic strip may be considered to be a deflection equal to the deflection to which the bimetallic strip 16 would be subjected when experiencing a temperature rise from normal room or ambient temperature to the low temperature setting of the indicia 43. This may be considered a first operating range with the second operating range being that between low and high on the indicia 43. Thus, when the knob 42 is moved from the position of Figure 4 to the position of Figure 1, the thermostat operator is given positive assurance that the thermostat is turned off. This has definite advantage in many electrical appliances, such as flatirons or room heaters, to enable an electrical appliance to pass standards set by the various electrical testing organizations and takes the place of a separate "on-off" switch with a toggle mechanism such as is customarily used in a combined "on-off" switch and potentiometer as used in the volume control of a radio receiving set.

When the round bar 47 is on one side of the detent dimple 56, as shown in Figure 4, the contacts 27 and 28 are closed; and conversely, when the round bar 47 is on the other side of the detent dimple, the contacts are open. Thus, the rotational position of the detent spring member 52 is such that the tactile indication coincides with the opening and closing of the contacts 27 and 28. Also, this may be considered to be the dividing line or junction between the first and second operating ranges.

The contacts 27 and 28 are illustrative of operating portions on a temperature sensitive device or other device responsive to a variable condition. Also, the adjusting screw 38 is a means to relatively adjust the positions of the contacts 26 and 27, and the bimetallic strip 16 is a means responsive to a variable condition to relatively move these two contacts. Also, the rigid deflecting strip 20 relatively positions the bimetallic strip; and in consequence, relatively positions the first contact strip 14 to provide a relative position of the contacts out of engagement regardless of temperature with the detent in the position shown in Figures 1 to 3.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A thermostat comprising, a base, first and second operating portions carried by said base for mutual cooperation, first means cooperating with said base for relative adjustment of said operating portions, variable means to relatively move said operating portions, stop means cooperating with said base and said first means for providing an adjustment limit thereof, deflecting means to relatively position said operating portions out of engagement with said first means at said adjustment limit, and spring detent means having first and second parts, means to fasten said first part to one of said base and said first means, abutment means to cause frictional engagement of said second part with the other of said base and said first means, said abutment means and said stop means being positioned relative to said spring detent means such that said operating portions are in and out of mutual engagement when said abutment means is on first and second sides, respectively, relative to said spring detent means.

2. A thermostat comprising, a base, first and second contacts carried by said base for mutual cooperation, first means cooperating with said base for relative adjustment of said contacts, temperature responsive means to relatively move said contacts, stop means cooperating with said base and said first means for providing an adjustment limit thereof, deflecting means to relatively position said contacts out of engagement regardless of temperature with said first means at said adjustment limit, and spring detent means having first and second parts, means to fasten said first part to one of said base and said first means, abutment means to cause frictional engagement of said second part with the other of said base and said first means, said abutment means and said stop means being positioned relative to said spring detent means such that said contacts are in and out of mutual engagement when said abutment means is on first and second sides, respectively, relative to said spring detent means.

3. A thermostat comprising, a base, first and second contacts carried by said base for mutual cooperation, a shaft carried by said base, means cooperating with said base and said shaft providing for longitudinal adjustment of said shaft, means to relatively adjust said contacts in accordance with longitudinal movement of said shaft, temperature responsive means to relatively move said contacts, stop means providing a longitudinal limit of said shaft relative to said base, said stop means including a bar on said shaft for engagement with a projection carried by said base, a resilient detent member having first and second legs, means to fasten said first leg on said base, said second leg adapted to frictionally cooperate with said bar on said shaft as said bar is moved past said second leg, said member second leg being positioned relative to said base such that said contacts are out of mutual engagement when said bar is on the said longitudinal limit side of said second leg and said contacts are in mutual engagement when said bar is on the other side of said second leg.

4. A thermostat comprising, a base, first and second contacts carried by said base for mutual cooperation, a shaft carried by said base, means cooperating with said base and said shaft providing for longitudinal adjustment of said shaft, means to relatively adjust said contacts in accordance with longitudinal movement of said shaft, temperature responsive means to relatively move said contacts, stop means providing a longitudinal limit of said shaft relative to said base, deflecting means to relatively position said contacts out of engagement regardless of temperature with said shaft at said longitudinal limit, said stop means including a bar on said shaft for engagement with a projection carried by said base, a resilient detent member having first and second legs, means to fasten said first leg on said base, said second leg adapted to frictionally cooperate with said bar on said shaft as said bar is moved past said second leg, said member second leg being positioned relative to said base such that said contacts are out of mutual engagement when said bar is on the said longitudinal limit side of said second leg and said contacts are in mutual engagement when said bar is on the other side of said second leg.

5. A thermostat comprising, a base, first and second contacts carried by said base for mutual cooperation, a surface defining a threaded aperture on said base, a threaded shaft threadably carried in said aperture for longitudinal adjustment of said shaft, means to relatively adjust said contacts in accordance with longitudinal movement of said shaft, temperature responsive means to relatively move said contacts, deflecting means to relatively position said contacts out of engagement regardless of temperature with said shaft at said one rotational position, a bar extending from said shaft, a resilient L-shaped detent member having first and second legs, means to fasten said first leg on said base, an inwardly extending detent dimple on said second leg adapted to cooperate with said bar on said shaft as said bar is rotated past said dimple, said member second leg being rotatably positioned relative to said base such that said contacts are out of mutual engagement when said bar is on said one rotational position side of said detent dimple and said contacts are in mutual engagement when said bar is on the other side of said detent dimple to thus give a tactile indication as to said contacts being in and out of engagement.

6. A thermostat comprising, a base, first and second contacts carried by said base for mutual cooperation, a surface defining a threaded aperture on said base, a threaded shaft threadably carried in said aperture for longitudinal adjustment of said shaft, means to relatively adjust said contacts in accordance with longitudinal movement of said shaft, temperature responsive means to relatively move said contacts, stop means providing a rotational limit of said shaft relative to said base, deflecting means to relatively position said contacts out of engagement regardless of temperature with said shaft at said rotational limit, said stop means including a bar extending outwardly from said shaft for engagement with a projection carried by said base, a resilient L-shaped detent member having first and second legs, means to fasten said first leg on said base, an inwardly extending detent dimple on said second leg adapted to cooperate with said bar on said shaft as said bar is rotated past said dimple, said member second leg being rotatably positioned relative to said base such that said contacts are out of mutual engagement when said bar is on the rotational limit side of said detent dimple and said contacts are in mutual engagement when said bar is on the other side of said detent dimple to thus give a tactile indication as to said contacts being in and out of engagement.

7. A thermostat comprising, a base, first and second resilient contact strips carried on said base, first and second contacts carried on said first and second strips, respectively, for mutual cooperation, a threaded nut carried on said base, a threaded shaft threadably carried in said nut for longitudinal adjustment of said shaft, means to adjustably move said first contact strip in accordance with longitudinal movement of said shaft, temperature responsive means to move said second strip, stop means providing a rotational limit of said shaft relative to said base, said stop means including a bar extending outwardly from said shaft for engagement with a projection on said base, a resilient L-shaped detent member having first and second legs, means to fasten said first leg between said nut and said base, an inwardly extending detent dimple on said second leg adapted to cooperate with said bar on said shaft as said bar is rotated past said dimple, said member second leg being rotatably positioned relative to said base such that said contacts are out of mutual engagement when said bar is on the rotational limit side of said detent dimple and said contacts are in mutual engagement when said bar is on the other side of said detent dimple.

8. A thermostat comprising, a base, first and second resilient contact strips carried on said base, first and second contacts carried on said first and second strips, respectively, for mutual cooperation, a surface defining a threaded aperture on said base, a threaded shaft threadably carried in said aperture for longitudinal adjustment of said shaft, means to adjustably move said first contact strip in accordance with longitudinal movement of said shaft, temperature responsive means to move said second strip, stop means providing a rotational limit of said shaft relative to said base, deflecting means to position said second contact out of engagement with said first contact regardless of temperature with said shaft at said rotational limit, said stop means including a bar on said shaft for engagement with a projection on said base, a resilient detent member having first and second legs, means to fasten said first leg on said base, said second leg adapted to frictionally cooperate with said bar on said shaft as said bar is rotated past said second leg, said member second leg being rotatably positioned relative to said base such that said contacts are out of mutual engagement when said bar is on the rotational limit side of said second leg and said contacts are in mutual engagement when said bar is on the opposite side of said second leg.

9. A thermostat comprising, a base, first and second resilient contact strips carried on said base, first and second contacts carried on said first and second strips, respectively, for mutual cooperation, a surface defining a threaded aperture on said base, a threaded shaft threadably carried in said aperture for longitudinal adjustment of said shaft, means to adjustably move said first contact strip in accordance with longitudinal movement of said shaft, temperature responsive means to move said second strip, stop means providing a rotational limit of said shaft relative to said base, deflecting means to position said second contact out of engagement with said first contact regardless of temperature with said shaft at said rotational limit, said stop means including a bar extending outwardly from said shaft for engagement with a projection on said base, a resilient L-shaped detent member having first and second legs, means to fasten said first leg on said base, an inwardly extending detent dimple on said second leg adapted to cooperate with said bar on said shaft as said bar is rotated past said dimple, said member second leg being rotatably positioned relative to said base such that said contacts are out of mutual engagement when said bar is on the rotational limit side of said detent dimple and said contacts are in mutual engagement when said bar is on the other side of said detent dimple to thus give a tactile indication as to said contacts being in and out of engagement.

10. A thermostat comprising, a base, first and second resilient contact strips carried on said base, first and second contacts carried on said first and second strips, respectively, for mutual cooperation, a nut carried by said base, a threaded shaft threadably carried in said nut for longitudinal adjustment of said shaft, means to adjustably move said first contact strip in accordance with longitudinal movement of said shaft, bimetallic means to move said second strip, stop means providing first and second opposite rotational limits of said shaft relative to said base, deflecting means carried by said base to position said second contact out of engagement with said first contact regardless of temperature with said shaft in said first rotational limit, said stop means including a bar extending axially and radially spaced from the axis of said shaft for engagement with an axial projection on said nut, a resilient L-shaped detent member having first and second legs, an oval-shaped aperture in said first leg surrounding said shaft, said first leg being fastened between said nut and said base with said oval-shaped aperture providing radial adjustment of said member second leg relative to said shaft during assembly of said thermostat, and an inwardly extending detent dimple on said second leg adapted to cooperate with said bar on said shaft as said bar is rotated past said dimple, said member second leg being rotatably positioned relative to said nut such that said contacts are in mutual engagement when said bar is on the second rotational limit side of said detent dimple and said contacts are out of mutual engagement when said bar is on the first rotational limit side of said detent dimple to thus give a tactile indication that said contacts are out of engagement.

11. A thermostat comprising, a base, first and second resilient contact strips carried on said base, first and second contacts carried on said first and second strips, respectively, for mutual cooperation, a nut carried by said base, a threaded shaft threadably carried in said nut for rotational and hence longitudinal adjustment of said shaft, said threaded shaft acting directly on said first contact strip to adjustably move said first contact strip in accordance with longitudinal movement of said shaft, bimetallic means acting directly on said second strip to move same, stop means providing first and second opposite rotational limits of said shaft relative to said base, deflecting means carried by said base to position said second contact out of engagement with said first contact regardless of temperature with said shaft in said first rotational limit, said stop means including a round bar welded to and extending longitudinally along said shaft for engagement with a radially spaced axial projection on said nut, a resilient L-shaped detent member having first and second legs, an oval-shaped aperture in said first leg surrounding said shaft, said first leg being fastened between said nut and said base with said oval-shaped aperture providing radial adjustment of said member second leg relative to said shaft during assembly of said thermostat, an inwardly extending detent dimple on said second leg adapted to cooperate with said bar on said shaft as said bar is rotated past said dimple, said member second leg being rotatably positioned relative to said nut such that said contacts are in mutual engagement when said bar is on the second rotational limit side of said detent dimple and said contacts are out of mutual engagement when said bar is on the first rotational limit side of said detent dimple to thus give a tactile indication that said contacts are out of engagement.

12. A thermostat including a base, a first elastic contact strip, a second flexible contact strip, an elastic bimetallic strip, each of said strips having first and second ends, stack means on said base for rigidly clamping said first ends of each of said strips with said strips extending in substantially the same direction from the first to the second end thereof, a deflecting strip having first and second ends, means for clamping said first end of said deflecting strip in said stack means with said second end thereof extending in substantially the same direction as the second ends of the other strips, at least one insulating washer mounted in said stack means for mutually insulating said contact strips, first and second contact points mounted, respectively, on said second ends of said first and second contact strips and adapted to electrically contact each other to pass current therebetween, a manually adjustable device adapted to move the second end of said second flexible contact strip relative to said first contact strip to establish variable operating temperature conditions between open and closed conditions of said contact points, said bimetallic strip adapted to be stressed to deflect in a given direction upon temperature variations in a given sense throughout first and second contiguous temperature ranges, an insulating tip mounted on said second end of said bimetallic strip and adapted to move said second end of said first contact strip as said bimetallic strip is deflected throughout said second temperature range, said deflecting strip deflecting the second end of one of said elastic strips thus to deflect at least said first elastic contact strip from a first to a second position, said deflection of said first contact strip being in the same direction and of substantially the same degree of deflection as the deflection of said bimetallic strip during temperature variations in said given sense through said first temperature range, stop means acting between said manually adjustable device and said base to provide first and second adjustment limits of said adjustable device at the two extremities of said two contiguous operating ranges, and spring detent means cooperating with said stop means establishing a tactile indication as said manually adjustable device varies the operating temperature through a temperature corresponding to the junction between said first and second temperature ranges.

13. A controllable electrical device having off and on conditions and comprising, a base, longitudinally adjustable means carried by said base, means to adjust a condition of said device in accordance with longitudinal movement of said adjustable means, condition responsive means carried by said base, stop means providing a longitudinal limit of said adjustable means relative to said base, said stop means including a bar on said adjustable means for engagement with a projection carried by said base, a resilient detent member fastened to said base, said detent member adapted to frictionally cooperate with said bar as said bar is moved past said detent member, said detent member being positioned relative to said base such that said device is in said off condition when said bar is on the said longitudinal limit side of said detent member and said device is in said on condition when said bar is on the other side of said detent member.

14. A controllable electrical device having off and on conditions and comprising, a base, longitudinally adjustable means carried by said base, means to adjust a condition of said device in accordance with longitudinal movement of said adjustable means, condition responsive means carried by said base, stop means providing a longitudinal limit of said adjustable means relative to said base, said stop means including a bar on said adjustable means for engagement with a projection carried by said base, a resilient detent member having first and second legs, means to fasten said first leg on said base, said second leg adapted to frictionally cooperate with said bar as said bar is moved past said second leg, said member second leg being positioned relative to said base such that said device is in said off condition when said bar is on the said longitudinal limit side of said second leg and said device is in said on condition when said bar is on the other side of said second leg.

15. A thermostat comprising, a base, first and second contacts carried by said base for mutual cooperation, adjustable means carried by said base to relatively adjust said contacts in accordance with longitudinal movement of said adjustable means, temperature responsive means to relatively move said contacts, stop means providing a longitudinal limit of said adjustable means relative to said base, deflecting means to relatively position said contacts out of engagement regardless of temperature with said adjustable means at said longitudinal limit, said stop means including a bar on said adjustable means for engagement with a projection carried by said base, a resilient detent member having first and second legs, means to fasten said first leg on said base, said second leg adapted to frictionally cooperate with said bar as said bar is moved past said second leg, said member second leg being positioned relative to said base such that said contacts are out of mutual engagement when said bar is on the said longitudinal limit side of said second leg and said contacts are in mutual engagement when said bar is on the other side of said second leg.

16. A controllable condition responsive device having off and on conditions and comprising, a base, longitudinally adjustable means carried by said base, means to adjust a condition of said device in accordance with longitudinal movement of said adjustable means, condition responsive means carried by said base, stop means providing a longitudinal limit of said adjustable means relative to said base, deflecting means to establish said off condition of said device with said adjustable means at said longitudinal limit regardless of the ambient condition at said condition responsive means, said stop means including a bar on said adjustable means for engagement with a projection carried by said base, a resilient detent member having first and second legs, means to fasten said first leg on said base, said second leg adapted to frictionally cooperate with said bar as said bar is moved past said second leg, said member second leg being positioned relative to said base such that said device is in said off condition when said bar is on the said longitudinal limit side of said second leg and said device is in said on condition when said bar is on the other side of said second leg.

References Cited in the file of this patent

UNITED STATES PATENTS 2,702,844     Kronmiller            Feb. 22, 1955